United States Patent
Guthridge et al.

(10) Patent No.: US 6,393,557 B1
(45) Date of Patent: May 21, 2002

(54) DYNAMIC METHOD FOR CONFIGURING A COMPUTER SYSTEM

(75) Inventors: D. Scott Guthridge; Wayne Alan Downer; Kyle Gerhard Grieser; Gerrit Huizenga, III, all of Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/307,128

(22) Filed: May 7, 1999

Related U.S. Application Data
(60) Provisional application No. 60/084,775, filed on May 8, 1998.

(51) Int. Cl.[7] .............................................. G06F 15/177
(52) U.S. Cl. ........................................... 713/1; 713/100
(58) Field of Search ............................... 713/1, 2, 100; 709/321, 327

(56) References Cited

U.S. PATENT DOCUMENTS

| | | | | |
|---|---|---|---|---|
| 5,251,290 A | | 10/1993 | Pabon ........................ 395/120 |
| 5,546,595 A | * | 8/1996 | Norman et al. ................ 710/10 |
| 5,630,173 A | | 5/1997 | Oprescu ....................... 710/40 |
| 5,675,748 A | * | 10/1997 | Ross ........................... 710/104 |
| 5,682,479 A | | 10/1997 | Newhall et al. ............. 709/242 |
| 5,712,791 A | | 1/1998 | Lauterbach .................. 364/489 |
| 5,732,192 A | | 3/1998 | Malin et al. ............ 395/500.23 |
| 5,784,648 A | | 7/1998 | Duckwall ..................... 710/40 |
| 5,802,289 A | | 9/1998 | Oprescu ...................... 709/248 |
| 5,828,851 A | * | 10/1998 | Nixon et al. ................. 710/105 |
| 5,862,386 A | | 1/1999 | Joseph et al. ................ 395/712 |
| 5,870,566 A | | 2/1999 | Joh ............................. 709/251 |
| 5,877,966 A | * | 3/1999 | Morris et al. ........... 395/500.05 |
| 5,964,871 A | * | 10/1999 | Hester et al. ................... 713/1 |

OTHER PUBLICATIONS

Patterson et al., *Computer Architecture A Quantitative Approach*, 2nd Ed. 1996, pp. 571–594.
McKusick et al., *The Design and Implementation of the 4.4BSD Operating System*, Aug. 1996, pp. 45, 496–502.
Tving, Ivan, *Multiprocessor Interconnection Using SCI, a Master Thesis*, Aug. 28, 1994, pp. 18–57.
Johnson et al., *Interconnect Topologies with Point–to–Point Rings*, Dec. 1991, pp. 1–11, Computer Sciences Technical Report #1058, University of Wisconsin.

* cited by examiner

*Primary Examiner*—Dennis M. Butler
(74) *Attorney, Agent, or Firm*—Klarquist Sparkmen Campbell Leigh & Whinston, LLP

(57) ABSTRACT

A method for configuring devices within a computer system provides device configuration information for types of devices that may be included within the computer system. The device configuration information for a device type includes interface types by which devices of that device type connect to other devices. The method includes determining the interface types of a current object associated with a device. Device types that can exist on a determined interface type of the current object are probed for. A child object is created for a device found from the probing and a link between the current object and the child object is also created. A child object is then made the current object, and the above actions are repeated at least until the devices to be configured within the system have associated objects linked together.

25 Claims, 10 Drawing Sheets

DRIVER CONFIGURATION FILES

| DEVICE TYPE | INCOMING INTERFACE TYPE (ONIFACE) | OUTGOING INTERFACE TYPE (IFACE) |
|---|---|---|
| SYSTEM INTERCONNECT | -- | SCI |
| NODE | SCI | PCI, EISA |
| CONTROLLER TYPE 1 (FF) | PCI | FC |
| INTERCONNECT TYPE 1 (FABRIC) | FC | FCP |
| CONTROLLER TYPE 2 (FCBR) | FCP | MSCSI |
| INTERCONNECT TYPE 2 (SCSI BUS) | MSCSI | SCSI |
| DISK, TAPE, CD | SCSI, FCP | -- |

FIG. 2

1. for each object scheduled for probing
2. for each interface type the object provides
3. for each device type on the interface
4. for each parent port in that interface type
5. for each hardware address (unit)
   probe
      if found
         create object (if new) and link thereto
         schedule object for probing

LINK DATA STRUCTURE

OBJECT DATA STRUCTURE

BEFORE REVERSE COALESCENCE

AFTER REVERSE COALESCENCE

BEFORE FORWARD COALESCENCE

AFTER FORWARD COALESCENCE

| ID | DEVICE NAME |
|---|---|
| IBM806674343 | DISK 1 |
| SGT806345031 | DISK 2 |
| CON832324534 | DISK 3 |
| PSEUDO78934 | INTERCONNECT 3 |
| ............... | ............ |

Fig. 10

| DERIVED ID | PSEUDO-ID |
|---|---|
| 1234567 | PSEUDO78934 |
| 2345676 | PSEUDO78934 |
| 3456789 | PSEUDO78934 |
| 3469293 | PSEUDO99364 |
| ............ | .................. |

Fig. 11

DYNAMIC METHOD FOR CONFIGURING A COMPUTER SYSTEM

RELATED APPLICATION DATA

This application claims the benefit of U.S. Provisional Application No. 60/084,775, filed May 8, 1998, and is related to copending application Ser. No. 09/307,132 filed on May 7, 1999.

FIELD OF THE INVENTION

This invention relates generally to methods for configuring computer systems, such a method being the process for recognizing and enabling the elements of the system so that the elements operate together properly. More particularly, this invention relates to a dynamic method for configuring computer systems which recognizes system elements wherever they may be found in the configuration.

BACKGROUND OF THE INVENTION

Computer systems—whether uniprocessor machines such as personal computers or multiprocessor computers that contain separate but interconnected processor nodes—are comprised of a number of different system elements such as buses, disks, and other devices that must cooperate for the system to operate properly. Bringing about this cooperation is the task of a configuration procedure within the operating system of the computer. A configuration procedure recognizes and enables the hardware devices in the system by communicating system information between the software drivers for the devices and the operating system. Autoconfiguration processes, which are well known in the art, work automatically to configure a system without the need for intervention by a system administrator. Such a process looks for certain types of hardware devices at specific system locations and reports to the operating system which device type is found at each location. See, for example, the description of a typical autoconfiguration procedure in the UNIX operating system given by McKusick et al. in The Design and Implementation of the 4.4 BSD Operating System (Addison-Wesley 1996).

A drawback of present autoconfiguration processes is their static nature. They typically rely on a table-like structure that represents the largest possible configuration, with each table location corresponding to a possible location in the computer system for a specified type of device. The autoconfiguration procedure looks only for the specified type(s) of devices at each system location and reports whether a device of the specified type is found or not found at that location. This approach works well enough with simpler, standard computer systems where all probable configurations can be anticipated. It does not work well, however, for systems such as large multiprocessor systems whose configurations are often customer-specific and continually changing. Using conventional configuration processes in such systems requires that the processes be constantly updated to anticipate new system configurations, a costly and time-consuming effort.

An objective of the invention, therefore, is to provide a dynamic method for configuring a computer system, one that does not rely on predetermined configurations but can recognize and enable system devices regardless of there system locations. Another objective of the invention is to provide a method for configuring a computer system with multiple paths between system devices.

SUMMARY OF THE INVENTION

A method for configuring devices within a computer system provides device configuration information for types of devices that may be included within the computer system. The device configuration information for a device type includes interface types by which devices of that device type connect to other devices. The method includes determining the interface types of a current object associated with a device. Device types that can exist on a determined interface type of the current object are probed for. A child object is created for a device found from the probing and a link between the current object and the child object is also created. A child object is then made the current object, and the above actions are repeated at least until the devices to be configured within the system have associated objects linked together.

These and other aspects of the invention are more fully described below with reference to an illustrative embodiment.

BRIEF DESCRIPTION OF THE DRAWINGS

FIG. 2 is a table showing the relevant portions of device configuration files for devices within the computer system of FIG. 1.

FIG. 10 is a table representing a device name database.

FIG. 11 is a table representing for providing pseudo-IDs to non-identifiable devices.

DETAILED DESCRIPTION OF AN ILLUSTRATIVE EMBODIMENT

The invention has been implemented within the operating system of a multiprocessor computer system such as the one shown and described herein. It should be readily recognized from this disclosure, however, that the invention is not limited to this illustrative embodiment but that aspects of it can be applied in any suitable software or any multiprocessor or uniprocessor system.

The Multiprocessor System and Its Multiple I/O Paths

Figure 1:
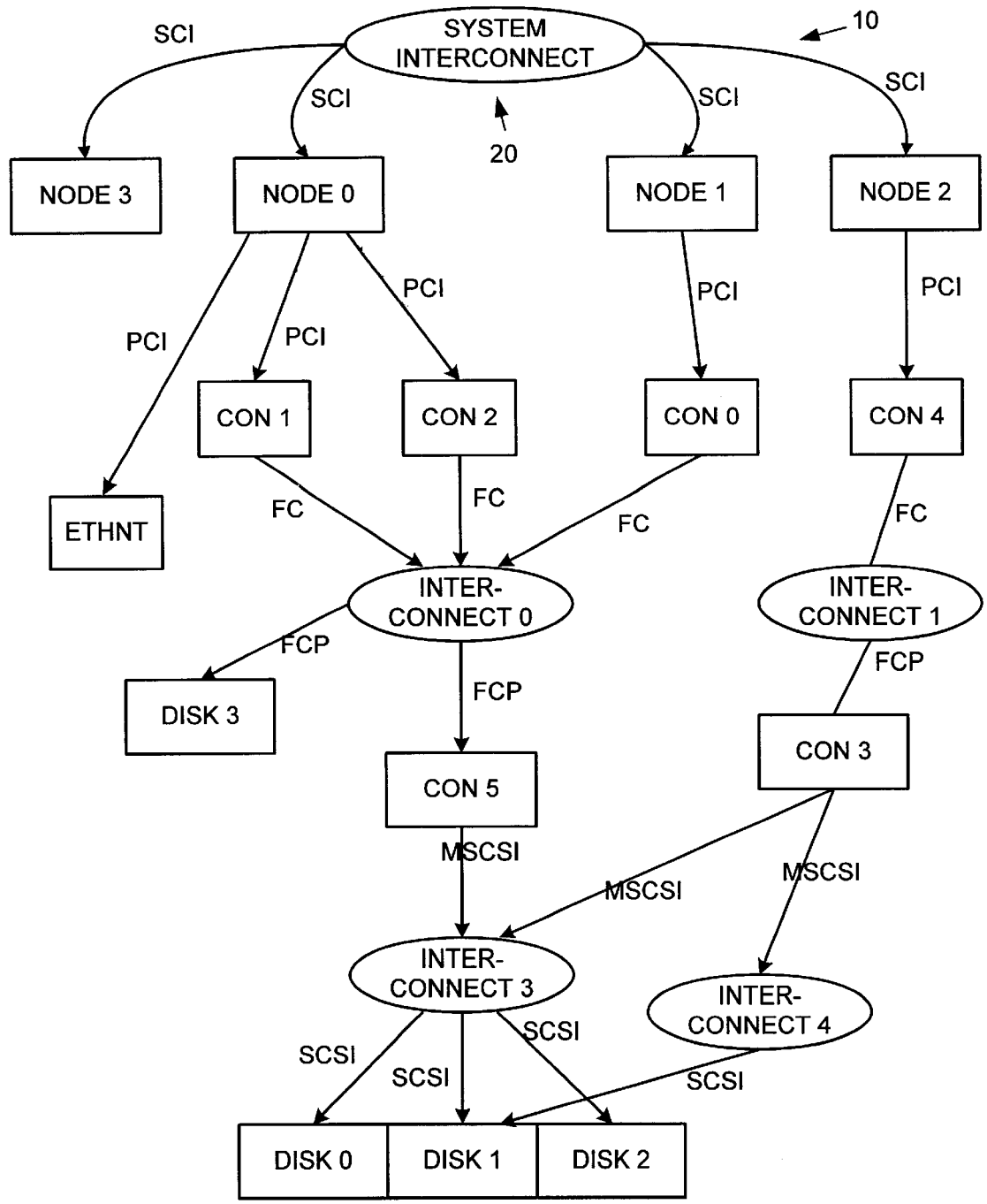
FIG. 1 is a block diagram of a multiprocessor system having multiple paths for routing data between processor nodes and I/O devices. The figure is also a configuration graph of the multiprocessor system.

FIG. 1 is a block diagram of a multiprocessor computer system 10 that uses a computer architecture based on distributed shared memory (DSM). This type of computer system is also known as a NUMA machine. In the system 10 four processor nodes 0, 1, 2, and 3 are shown connected by a system interconnect 20 that permits any node to communicate with any other node. The purpose of system interconnect 20 is to allow processors in any node to directly and transparently access the physical memory that resides in any other node. System interconnect 20 in the illustrative embodiment is a switch-based network that uses the Scalable Coherent Interface (SCI) interconnection mechanism. SCI is an IEEE-approved standard that is well documented in a number of publications including IEEE Std 1596–1992 (Aug. 2, 1993) and *Multiprocessor Interconnection Using SCI*, a Master Thesis by Ivan Tving, DTH ID-E 579 (1994), both of which are incorporated by reference. Other interconnects can, of course, be used.

The physical links of interconnect 20 provide high bandwidth and low latency and are scalable to allow for the addition of more nodes. Links that meet these requirements presently include point-to-point interconnects with a data throughput of one gigabyte/second or greater. The links can be configured in any number of suitable ways for connecting the processor nodes, such as in a ring topology, in arbitrary topologies through switches, or in a combination of both. The links can be wired or wireless (optical, RF, etc.) depending upon system performance needs. Additional topologies are described in "Interconnect Topologies with Point-To-Point Rings," Ross E. Johnson and James E. Goodman, December 1991, *Computer Sciences Technical Report#1058*, University of Wisconsin—Madison.

The elements of system 10 include the nodes and devices of its I/O subsystem that define multiple paths between I/O devices and processor nodes. These subsystem devices permit processors in the nodes to save data to and retrieve data from I/O devices. The subsystem devices include controllers (also known as adapters), interconnects (which may be an arbitrated loop, a switch fabric, a bus, etc.), and the I/O devices themselves, such as disk drives and tapes. A network controller Ethnt connects the system 10 to a local area network (LAN). Controllers such as con 0–5 convert data from one format to another for transmission through the I/O subsystem. Con 0, 1, 2, and 4, for example, may translate incoming data packets from the nodes into Fibre Channel packets. These packets are then forwarded through interconnects 0 and 1, which in this embodiment are Fibre Channel switches, to con 3 and 5. These controllers convert the Fibre Channel packets into a format suitable for I/O devices, such as a SCSI (Small Computer Serial Interface) format. The SCSI data packets are then sent through interconnects 3 and 4 to their intended destinations, such as multi-ported disk 1. These controllers, of course, work both ways, converting data being sent from I/O devices to processor nodes as well as data being sent from processor nodes to I/O devices.

Whether a controller or interconnect is needed in a multiprocessor system is a function of the system's composition. Some I/O devices, such as represented by disk 3, can handle data in Fibre Channel format and do not need an intermediate controller to convert the data to a different format. Other I/O devices may require other types of controllers. Other types of interconnects may be used. What should be appreciated from the illustrative embodiment is that multiple signal paths within the I/O subsystem of the multiprocessor system are provided for communicating data between a node and an I/O device; the particular nature of each path is not important to the invention.

Constructing a Configuration Graph as Part of System Configuration

FIG. 1 may also be viewed as a configuration graph of the multiprocessor system. Autoconfiguration is a process of the operating system that constructs the configuration graph in software as the process recognizes and enables the hardware devices in the system. Static autoconfiguration processes are well known in the art. They look for a certain hardware device at a specific system location and report whether such a hardware device is present at that location. See, for example, the description of a typical autoconfiguration procedure in the UNIX operating system given by McKusick et al. in The Design and Implementation of the 4.4 BSD Operating System (Addison-Wesley 1996). The autoconfiguration procedure in the illustrative embodiment differs from these conventional processes in that it is dynamic in nature rather than static. It recognizes hardware devices regardless of their location in the system.

In the illustrative embodiment, autoconfiguration is a process of the operating system's kernel that, with the kernel's device drivers, locates and prepares subsystem devices (I/O devices, controllers, interconnects, etc) for use. These devices can be interconnected in numerous ways such that there may be several "hops" through different types of controllers between a processor node and a given I/O device and multiple paths between the node and the I/O device. The autoconfiguration procedure navigates this tangle of devices, finds which devices are present, and determines how they are interconnected. The resulting "map" of these device interconnections takes the form of a directed graph where vertices represent devices and edges represent the links between them. A particular vertex in this graph, known as the "root", represents the system interconnect 20. All vertices in the graph are reachable by tracing paths through the edges from this root vertex. Communication between autoconfiguration and the device drivers gives the device drivers enough information to construct private data structures. The communication also gives autoconfiguration enough information to deduce the hardware configuration and thus to construct the configuration graph.

The term "object" is used herein to represent a vertex in the graph, and the term "link" to represent an edge. Each object and link represents a corresponding element of the hardware configuration. Each link is a directed link having a tail and a head. The object at the tail of a link is called the parent object and the object at the head of a link is called a child object. Thus, as shown in FIG. 1, there is a corresponding relationship between a particular system configuration and the configuration graph that represents it. While devices are often represented by single objects, this is not required. A device that has several major functions (such as supplying a number of serial ports, a SCSI bus and an Ethernet controller) can be represented by a multiple objects each representing a different function.

Each device within computer system 10 has associated configuration information provided in software such as in text files in the illustrated embodiment or in other forms such as data structures. The pertinent part of these files appear in FIG. 2 and includes a device type (also known as a config type or object type) indicating the type of device, one or more incoming interfaces (also known as an oniface or accepted or consumed interface) and one or more outgoing interfaces (also known as an iface or provided interface). As shown in FIG. 2, the devices types in computer system 10 are several. One device type is a system interconnect such as system interconnect 20 that has no incoming interface type an outgoing SCI interface type. Another device type is a node such as node 0 that has an incoming SCI interface type and outgoing PCI and EISA interface types. ("Outgoing" and "incoming" interfaces of the same type are needed between two devices for them to interconnect properly, much like a male connector of one type only interconnects properly to a female connector of the same type. A device with an outgoing SCI interface type, for example, connects through that interface only to devices with an incoming SCI interface type.) Other device types include FF controller (a PCI-to-Fibre Channel bridge), fabric interconnect (a Fibre Channel interconnect), FCBR controller (a Fibre Channel-to-SCSI bridge) and disk, tape, and compact disc. Each of these device types has one or more incoming interface types and one or more outgoing interface types, as indicated in the figure.

Figure 3:
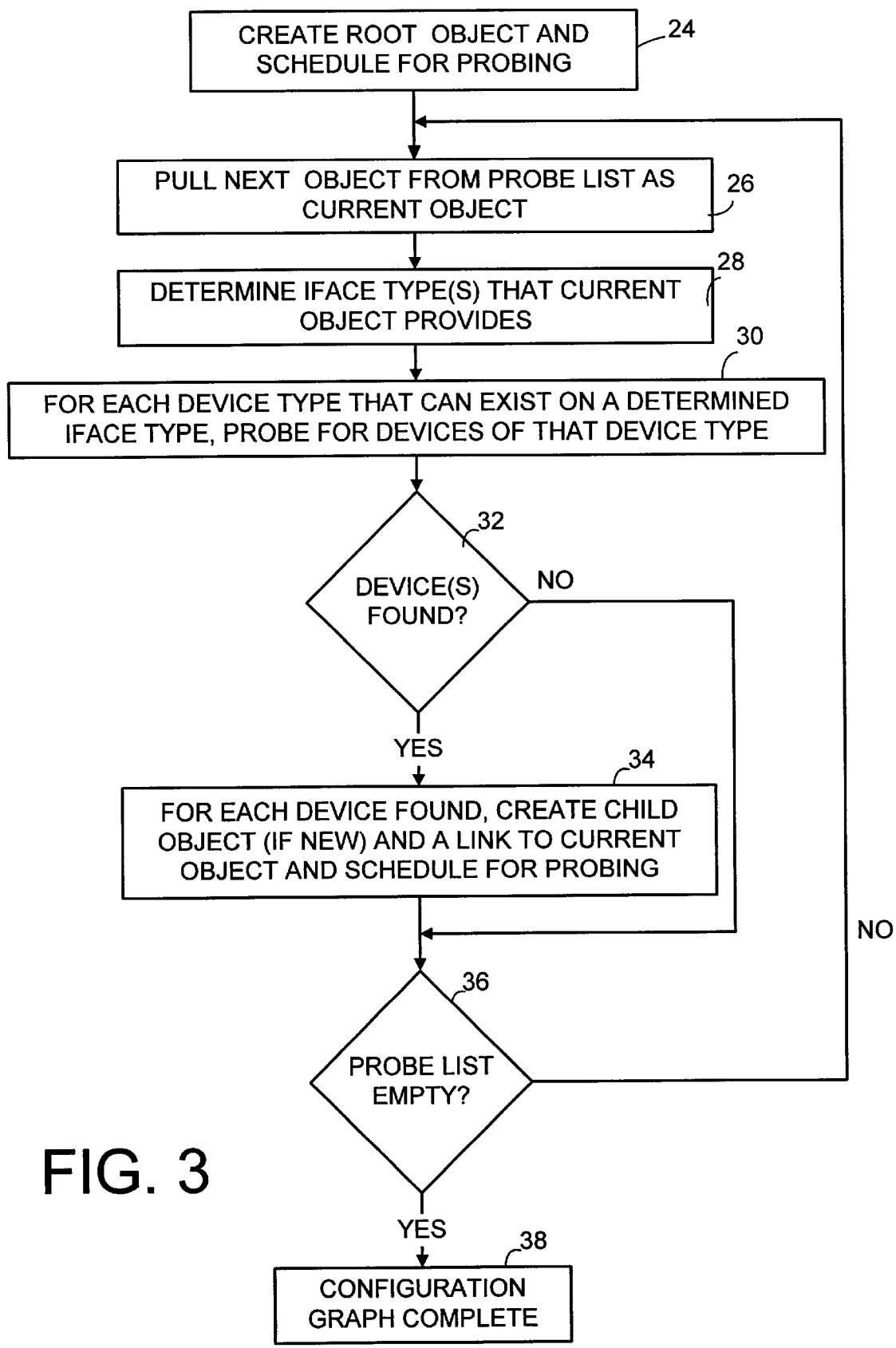
FIG. 3 is a flowchart of a method for configuring a computer system in accordance with the invention.

FIG. 3 is a flowchart of a method for configuring a computer system, using device configuration information such as shown in FIG. 2. The method at system initialization begins by creating a root object and scheduling it for probing (24). Creating a root object includes examining the device configuration information for a "root" device in the system. Its device configuration file is examined to determine its device type and interface types, and the root object is then created. The root object is then pulled from the probe list as the current object for probing (26). The outgoing interface types the current object provides are determined (28). The device configuration files (FIG. 2) are then checked for device types that can exist on the outgoing interface types provided by the current object (30). By "exist" is meant a device type that has an incoming interface type that matches an outgoing interface type of the current object and hence can connect to the device associated with the current object. Devices of a type that can exist on an outgoing interface of the current object are then probed for (30).

This probing for devices includes looking at the units of each port of the current object that is of the determined interface type. The port of an object is the interface's physical connection in the associated device. The units are hardware addresses of the port. For example, for the PCI interface, a port is a PCI bus. A unit of a port is a hardware address where a device connected to that bus may be found. Probing for devices thus includes looking at the port's units to determine what, if any, devices are connected to the port at the port's units.

Applying this part of the method to the computer system of FIG. 1, system interconnect 20 is the root device, and a root object is created for it. The system interconnect object is scheduled for probing and then, as the only element on the probe list, is pulled from the list as the current object. The only outgoing interface type for the system interconnect object is determined to be the SCI interface type. The device configuration files are then checked for device types that have an incoming SCI interface type. The only device type having an incoming SCI interface type is the node device type. The SCI ports and units of the system interconnect object are then probed for the presence of nodes.

Returning to FIG. 3, if a device is found as a result of a probe (32), a child object is created for the device if no object for the device presently exists. An object for the found device might already exist if the found device was found earlier as the result of a probe of another object and an object for the found device was created at that time. Whether an object for a device already exists is determined by checking a device name table that matches object names with hardware IDs of devices. If the hardware ID is in the table, then the object associated with that ID is determined to be an object for the found device. Certain devices, however, do not have hardware IDs and are non-identifiable. For these objects, a second object is created. This object or its duplicate is later removed through a coalescing operation, to be described. A link is then created between the current object and the child object and the child object is scheduled for probing (34). If no device is found as a result of the probe (32), no child object is created.

The probe list is then checked (36) for other objects to probe. If there are other objects, then actions 26–36 are repeated until all objects on the probe list have been probed. At that point all devices in the computer system with device configuration files have been found, and the configuration graph of objects representing these devices is complete.

Applying this part of the method to the computer system of FIG. 1, nodes 0–3 are detected. Child objects are created for each of the nodes, and links between these objects and the system interconnect object are also created. This is illustrated in FIG. 1 where these links are labeled "PCI" to indicate the common interface. The node objects are scheduled for probing and then taken from the probe list in the order in which they were scheduled. Actions 26–36 are then applied to each node object, yielding the creation of child objects for nodes 0, 1, and 2 and links thereto. These child objects are scheduled and probed in turn. The method continues until all the devices represented in FIG. 1 have associated objects and the configuration graph is complete.

In computer system 10, the different ways that found devices with existing objects are handled can be seen with respect to interconnect 0 and disk 1. Disk 1 has a hardware ID. The disk is found a first time as the result of a probe from the interconnect 3 object. Its hardware ID is not found in the device name table. An object therefore is created for the disk, and the object is linked to the interconnect 3 object. Additionally, the hardware ID of disk 1 and its corresponding object name are stored in the device name table. Disk 1 is then found a second time as a result of a probe from the interconnect 4 object. This disk hardware ID is found in the device name table this time, so no object is created. Instead, a link is created from the interconnect 4 object to the existing disk 1 object. Interconnect 0, on the other hand, has no hardware ID. Probes from the con 1, con 2, and con 0 objects each find the interconnect 0 device and create an object. The duplicate objects are then removed and their links redirected using coalescing operations, to be described.

Figure 5A:
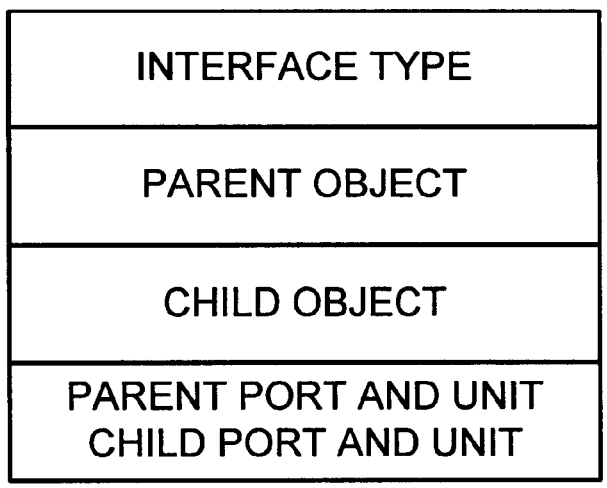
FIGS. 5A and B are block diagrams of exemplary data structures for links and objects represented by a configuration graph.
Figure 5B:
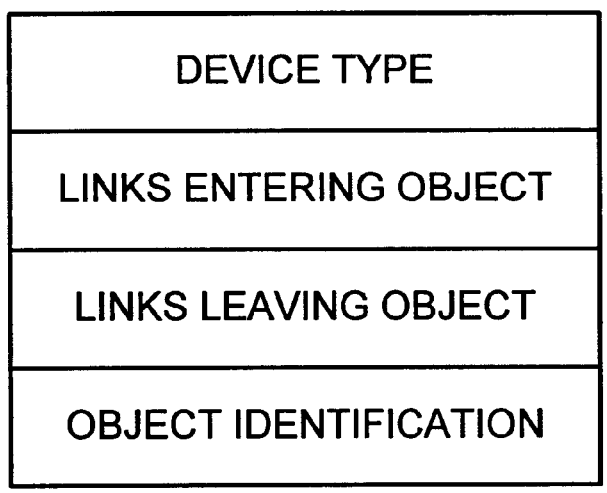

Creating an object or a link in the illustrative embodiment includes creating data structures that represent objects and links. FIGS. 5A and B are block diagrams showing the pertinent fields of exemplary data structures for the links and objects, respectively. It is the interconnection of these data structures that is represented by the configuration graph. FIG. 5A shows a link data structure which includes a parent object field that indicates where the link begins, a child object field that indicates where the link ends, and a field that indicates the parent object port and unit and child object port and unit for the link. FIG. 5B shows an object data structure which includes a field indicating the incoming links entering the object, a field indicating the outgoing links leaving the object, and an object identification field.

The same method is followed after on-line removal (OLR) or on-line insertion (OLI) of devices into a computer system, except that the method is applied only to affected parts of the system and not to the entire system.

Figures 4A, 4B:
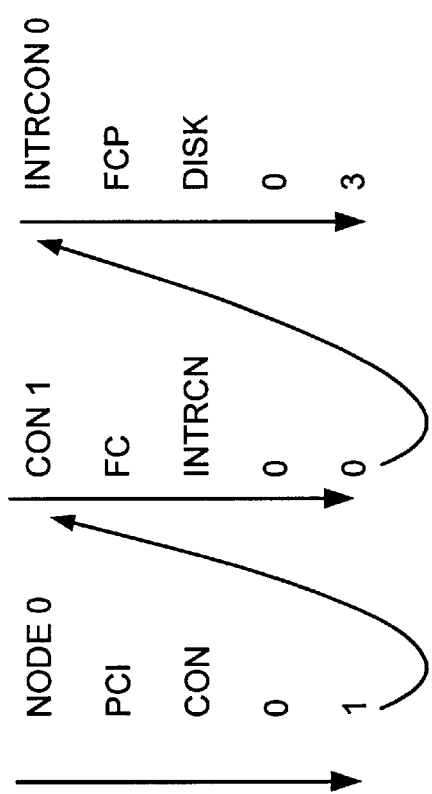
FIGS. 4A and B are, respectively, a block of pseudo-code describing how a configuration graph is constructed as part of configuring a computer system and an example thereof.

FIG. 4A illustrates the method above in an alternative way, using a block of pseudo-code instead of a flowchart. Initially a root object is created for system interconnect 20 and scheduled for probing. This object is then probed, which means that each of the actions described in the pseudo-code are performed on the object. In the case of the system interconnect object, the probing finds nodes 0–3, creates objects for them and links thereto, and schedules each node for probing. Each scheduled node is then probed in turn. For example, the object for node 0 is probed for connections to subsystem devices. To find the possible connections, each interface type the object provides is examined (pseudo-code line 1). In the case of node 0, these interface types may be PCI (Peripheral Component Interconnect local bus), EISA (Extended Industry Standard Architecture), or some other interface. For each interface type, each device type (also known as an object type or config type) that might be found on the interface is examined (pseudo-code line 2). For the PCI interface, possible device types in the illustrative embodiment include PCI-to-Fibre Channel bridge controllers such as con 1 or Ethernet controllers such as Ethnt. For each device type, each unit (hardware addresses) of each port of the interface type is then probed. In effect, the five lines of pseudo-code describe five nested loops that are used to examine each hardware address of each port of an object for connections to other devices. If a device is found and that device does not already have an object, a new object is created for the found device. A link between the probed object at the port and unit and the new object is created, and the new object is scheduled for probing FIG. 4B shows an example of how a portion of the FIG. 1 configuration graph is constructed using this method as illustrated in FIG. 4A. Assume that the object for node 0 is now being probed, which means that the units on its ports are examined for connections to other devices. The five nested loops are executed to reach these units. The probing at some point finds con 1 (which is of device type Controller (CON)) in port 0, unit 1 of the PCI interface, as shown in the left column of FIG. 3B. In accordance with the method, an object is created for con 1 and a link is created between the con 1 object and node 0 object. The con 1 object is then scheduled for probing, and at some later time is probed. The probing finds interconnect 0 at port 0, unit 0 of the Fibre Channel (FC) interface, as shown in the middle column of the figure. Interconnect 0 is a device of device type Interconnect (INTRCN) that may be found on the FC interface. In accordance with the method, an object is created for interconnect 0 and a link is created between the interconnect 0 object and the con 1 object. The interconnect 0 object is then scheduled for probing, and at some later time is probed. The probing finds disk 3 at port 0, unit 3 of the Fibre Channel P interface, as shown in the right column of the figure. Disk 3 is a device of device type disk (DISK) that may be found on the Fibre Channel P (FCP) interface. In accordance with the method, an object is created for disk 3 and a link is created between the disk 3 object and the interconnect 0 object. Disk 3, however, is not scheduled for probing because it is evident when its object is created that it has no interfaces for connecting to other devices downstream.

Reverse Coalescence

In some circumstances it is not recognized that a device already has an associated object, and a second, duplicate object is created for the same device. This occurs, for example, if a device does not have a hardware ID (a non-identifiable device), and thus cannot be found in the device name table.

Figure 6:
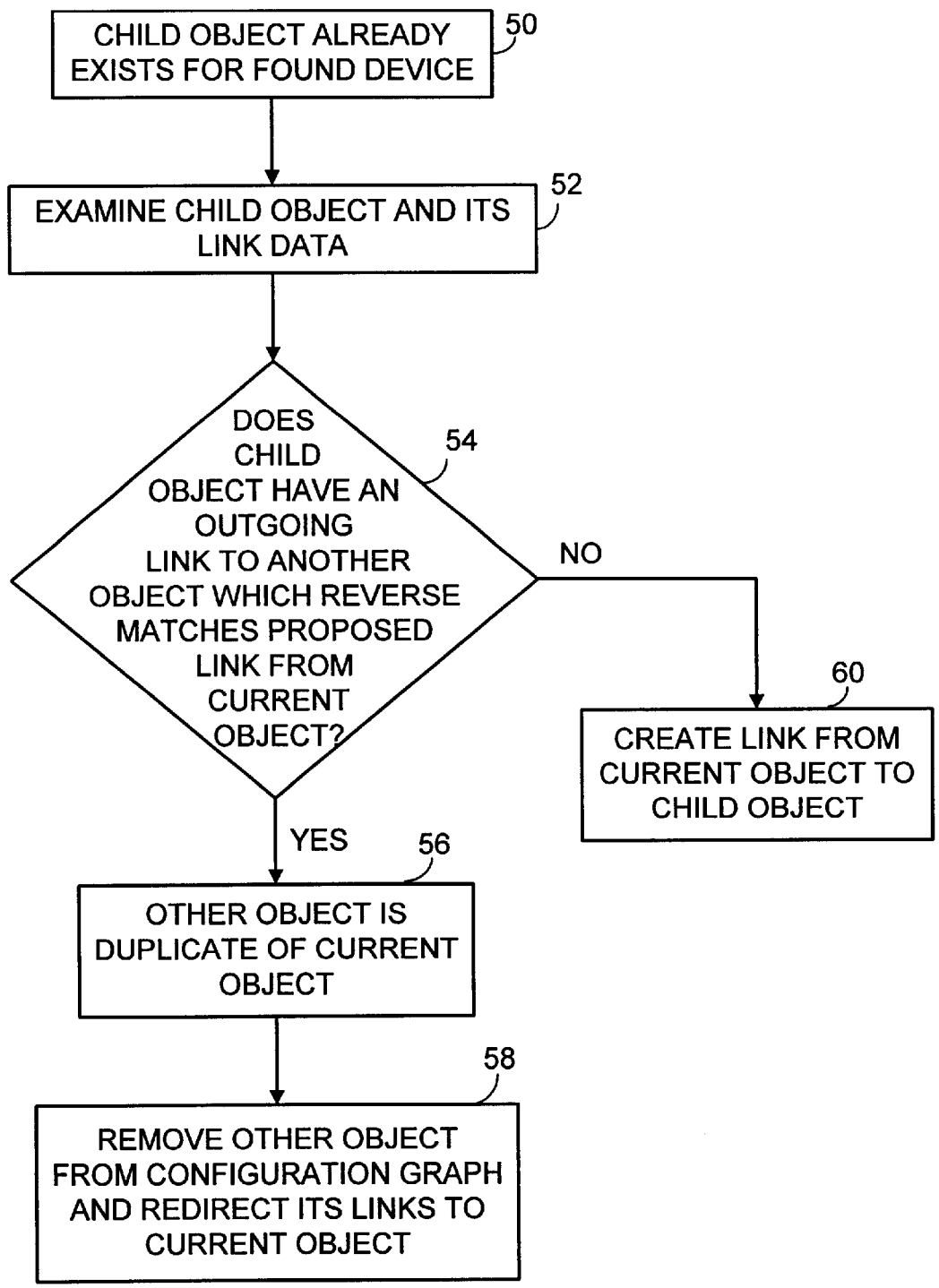
FIG. 6 is a flowchart of a first method for coalescing objects in accordance with the invention.

To eliminate these redundant objects, they are coalesced into a single object. One method referred to herein as reverse coalescence is illustrated in the flowchart of FIG. 6. The device associated with the current object is non-identifiable. As a result of a probe for devices on the current object, a device is found. A child object, however, already exists for the found device (50). The child object and its link data are then examined (52). From this examination it can be determined whether the child object has an outgoing link to another object that reverse matches a proposed link from the current object (54). By a "reverse match" is meant that the parent port and unit of the outgoing link match the child port and unit of the proposed link and the child port and unit of the outgoing link match the parent port and unit of the proposed link. If there is a match, then the current object is the duplicate of another object (56). The other object is then removed and its incoming links are redirected to the current object (58). (Alternatively, the current object could be removed and its incoming links redirected to the other object.) If there is no reverse match, then a link is created from the current object to the child object (60).

Figure 7A:
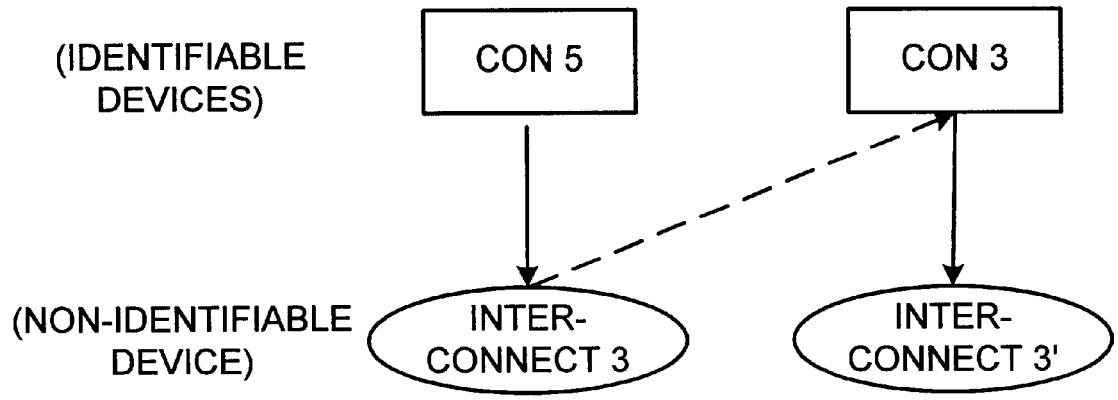
FIGS. 7A and B show a portion of the configuration graph of FIG. 1 before and after a reverse coalescence of objects in accordance with the first method.
Figure 7B:
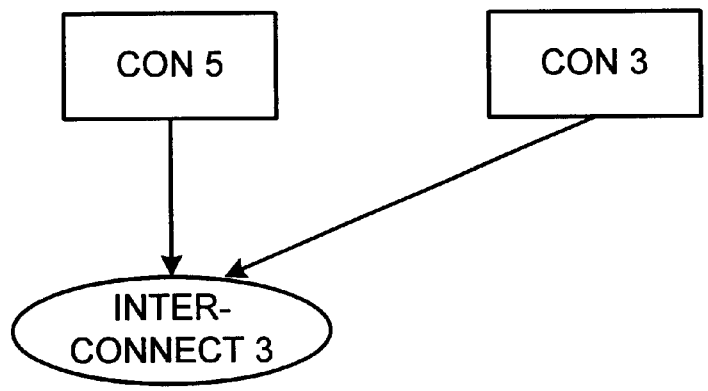

This method is applied in the example of FIGS. 7A and B. In FIG. 7A, interconnect 3 is an object for a non-identifiable device. It and an interconnect 3' object have been created as the result of probes from objects con 5 and con 3. The interconnect 3 object is now the current object. A probe of interconnect 3 detects that a child object already exists for con 3. The proposed link from interconnect 3 to con 3 (shown in the dashed line) is then checked for a reverse match against outgoing links from the con 3 object. A match occurs with the link to the interconnect 3' object, and it is recognized as a duplicate of the interconnect 3 object. Consequently, the interconnect 3' object is removed and its links redirected to the interconnect 3 object. The result is shown in FIG. 7B.

Forward Coalescence

Figure 8:
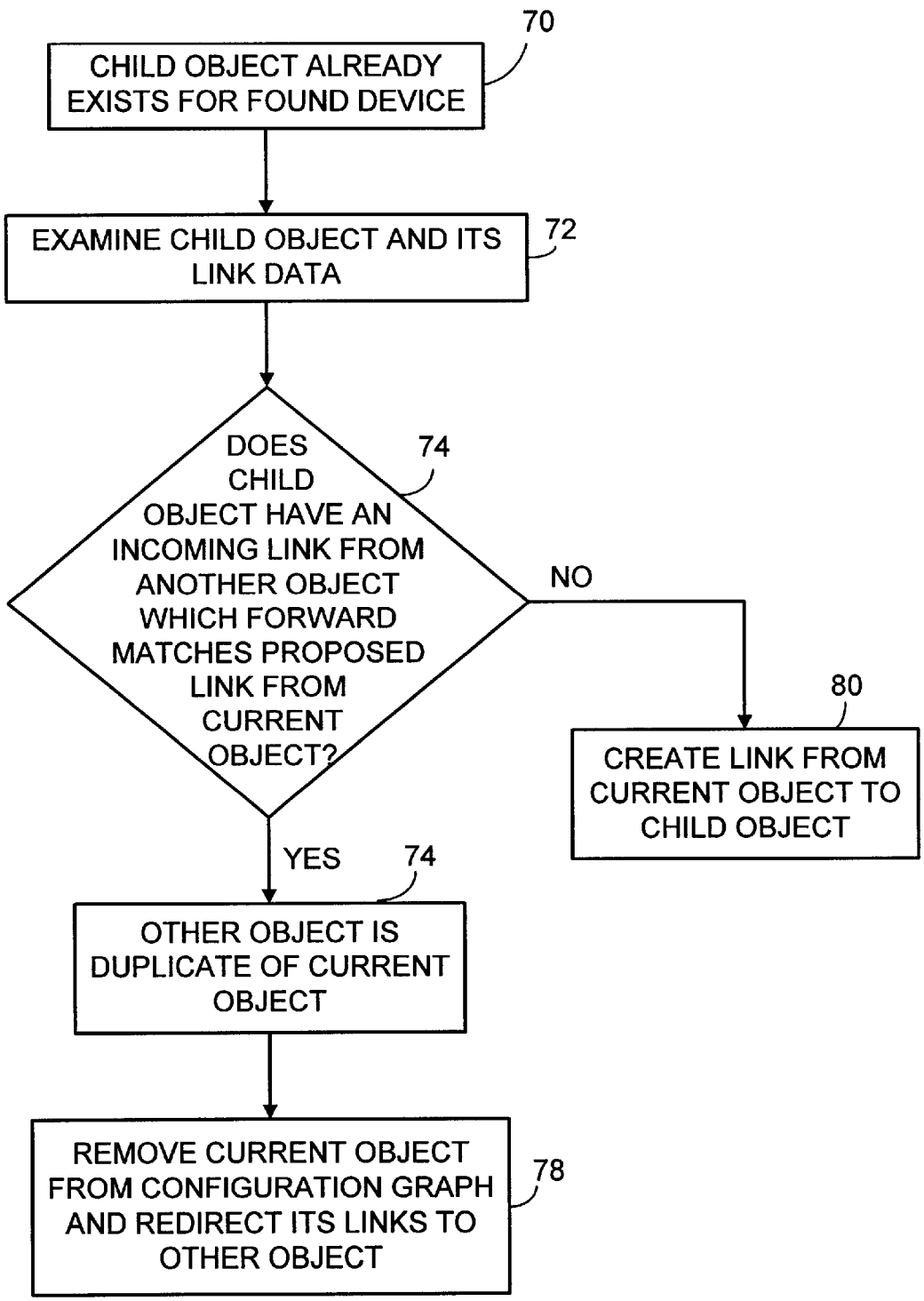
FIG. 8 is a flowchart of a second method for coalescing objects in accordance with the invention.

Another coalescing method referred to herein as forward coalescence is illustrated in the flowchart of FIG. 8. The device associated with the current object is non-identifiable. As a result of a probe for devices on the current object, a device is found. A child object, however, already exists for the found device (70). The child object and its link data are then examined (72). From this examination it can be determined whether the child object has an incoming link from another object that forward matches a proposed link from the current object (74). By a "forward match" is meant that the parent port and unit of the incoming link match the parent port and unit of the proposed link and the child port and unit of the incoming link match the child port and unit of the proposed link. If there is a match, then the current object is the duplicate of another object (76). The current object is then removed and its incoming links are redirected to the other object (78). (Alternatively, the other object could be removed and its incoming links redirected to the current object.) If there is no forward match, then a link is created from the current object to the child object (80).

Figure 9A:
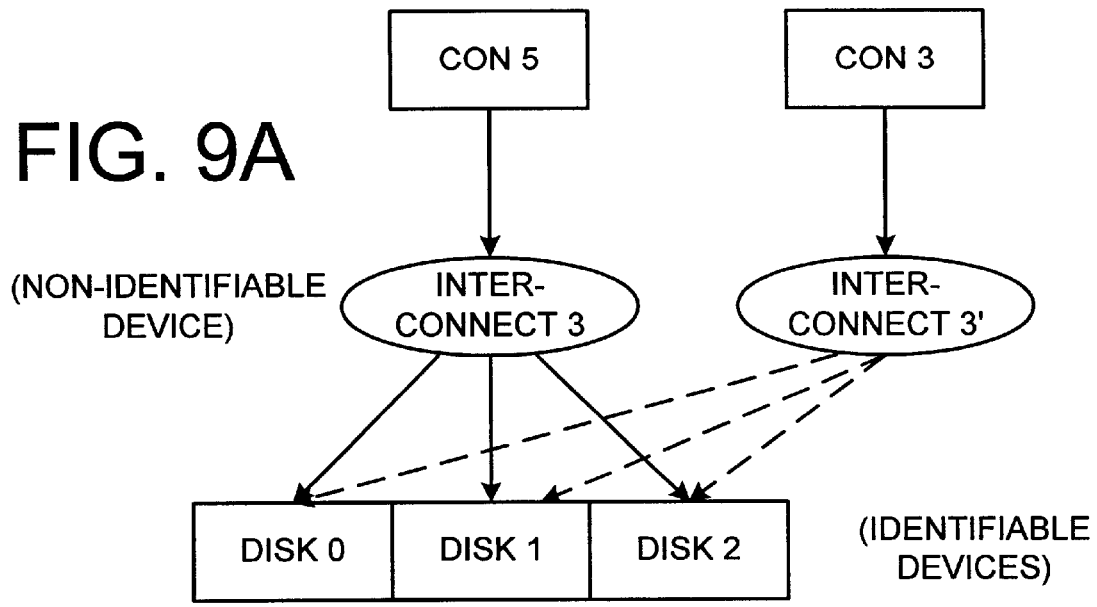
FIGS. 9A and B show a portion of the configuration graph of FIG. 1 before and after a forward coalescence of objects in accordance with the second method.
Figure 9B:
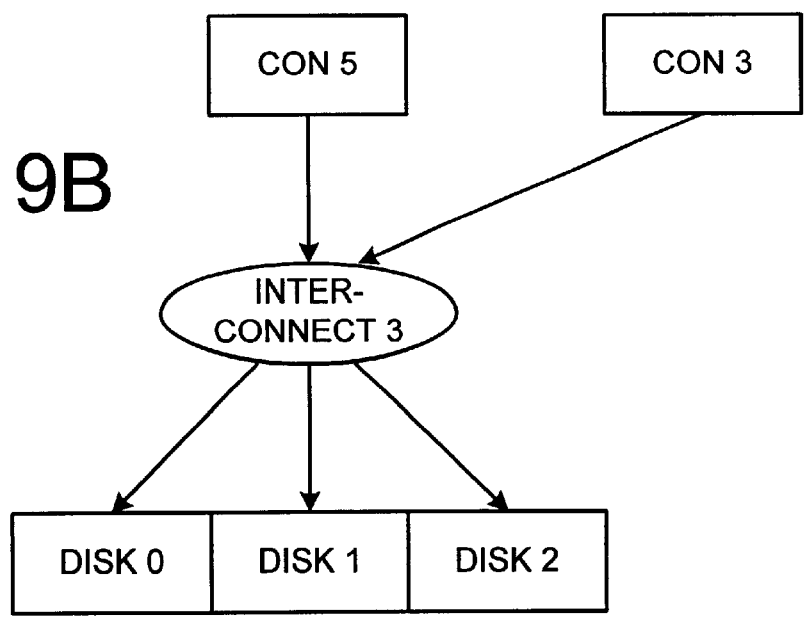

This second method is applied in the example of FIGS. 9A and B. In FIG. 9A, interconnect 3' is an object for a non-identifiable device. It and an interconnect 3 object have been created as the result of probes from objects con 5 and con 3. The interconnect 3 object is now the current object. A probe of interconnect 3' detects that a child object already exists for disk 0. The proposed link from interconnect 3 to disk (shown in the dashed line) is then checked for a forward match against incoming links to the disk 0 object. A match occurs with the link to the interconnect 3 object, and it is recognized as a duplicate of the interconnect 3' object. Consequently, the interconnect 3' object is removed and its incoming links redirected to the interconnect 3 object. The result is shown in FIG. 9B.

Device Naming

One consequence of using the dynamic method for configuring a computer system described above is that device names within the system (such as con 1, disk 0, etc.) change if a device is added or removed and the system is reconfigured. For example. if an additional disk is added to the disk array in FIG. 1 between disk 1 and disk 2, device names can "slip." Disk 2 will be renamed "disk 3" and disk 3 will be renamed "disk 4" on the next system configuration. Device name slippage can cause problems with applications that require device names to remain constant, such as in a database program that stores data using the name of the disk on which the data is stored. Changing the disk name may cause the database program to write to the wrong disk.

To prevent device name slippage, a device name database is constructed, permanently stored, and supplemented when new devices are added to the computer system. FIG. 10 is an example of such a database. For an identifiable device (such as one with a hardware ID), a database record contains the name of the device and its hardware ID. For a non-identifiable device, a data record contains a name of the device and a pseudo-ID created for the device.

Names are assigned to the devices after each system configuration. Before assigning a name to a device, however, the hardware ID of the device, if it exists, is looked up in the device name database. If the hardware ID is not found in the database, the device is assigned a name different from the other names in the database to distinguish it from the other devices. If the hardware ID is found in the database, then that device was previously named in another configuration. The name in the database record associated with that hardware ID is retrieved and again assigned to that device.

If the device does not have a hardware ID, then an ID is derived for the device using the configuration graph for the system. A parent object to the child object for the non-identifiable device is determined, and an ID for the device associated with the parent object is determined. This ID and information on the link between the two objects are combined to form a derived ID. The derived ID is then looked up in a table such as shown in FIG. 11 to determine if the derived ID has a corresponding pseudo-ID. If so, then the pseudo-ID is looked up in the device name database of FIG. 10 to find the name of the device. If not, then the device has not been previously named. A pseudo-ID is created for the device and added to the table of FIG. 11.

Note in the table of FIG. 11 that several derived IDs map to the same pseudo ID. This condition occurs where a child object has multiple parent objects. The derived IDs differ because the devices associated with the parent objects differ, but the pseudo-ID is the same since the same device is associated with the child object. In determining then whether a derived ID has a corresponding pseudo-ID, the configuration graph is examined to see if there are other parent objects to the child object associated with the device and, if so, whether a pseudo-ID has already been created for the device. In this case, the newly derived ID is simply mapped to the that pseudo-ID along with the IDs derived from the other parent objects.

Having illustrated and described the principles of the invention in an exemplary embodiment, it should be apparent to those skilled in the art that the illustrative embodiment can be modified in arrangement and detail without departing from such principles. For example, software aspects of the embodiment may be implemented in hardware and hardware aspects may be implemented in software. Data structures of various types may be substituted for those shown in the embodiment. The actions illustrated in the flowcharts may be taken in other orders. In view of the many possible embodiments to which the principles of the invention may be applied, it should be understood that the illustrative embodiment is intended only to teach these principles and is not intended to limit the scope of the invention. Rather, the invention is defined in the following claims. We therefore claim as our invention all that comes within the scope and spirit of these claims and their equivalents.

We claim:

1. In a computer system, a method for configuring devices within the system comprising:

providing device configuration information for types of devices that may be included within the computer system, the device configuration information for a device type including interface types by which devices of that device type connect to other devices;

determining the interface types of a current object associated with a device;

for each device type that can exist on a determined interface type of the current object, probing for devices of that type;

creating a child object for a device found from the probing and a link between the current object and the child object;

making a child object the current object; and repeating the above actions at least until the devices to be configured within the system have associated objects linked together.

2. The method of claim 1 wherein the interface types included in the device configuration information contain outgoing interface type and/or an incoming interface type for each device type.

3. The method of claim 2 wherein determining the interface types of a current object comprises determining the outgoing interface types of the current object.

4. The method of claim 2 wherein a device type exists on the interface type of the current object if an incoming interface type of a device type matches an outgoing interface type of the current object.

5. The method of claim 1 wherein probing for devices includes checking ports of the current object for devices connected to the port.

6. The method of claim 1 wherein probing for devices includes checking units of ports of the current object for devices connected to the port.

7. The method of claim 1 wherein creating a child object for a device includes creating an object data suture having a field for identifying the device type, a field for indicating links associated with the object, and a field for identifying the object.

8. The method of claim 1 wherein creating a link for an object includes creating a link data structure having a field for indicating an interface type and a field indicating the parent and child ports for the link.

9. A computer-readable medium on which is stored a set of instructions for executing the method of claim 1.

10. The method of claim 1 wherein creating a child object includes scheduling the child object on a probe list.

11. The method of claim 10 wherein making a child object a current object includes pulling the child object from the probe list.

12. The method of claim 1 wherein the computer system is a multiprocessor system having a non-uniform memory access architecture.

13. The method of claim 1 including:

providing a device name database having records with an ID for each device and corresponding device name;

before naming a found device, checking its ID in the database;

if the ID is present in the database, assigning the device the corresponding name.

14. The method of claim 13 including, if a device ID is not present in the database for a device to be named, adding the device ID to the database and assigning the device a name different from the other names in the database.

15. The method of claim 13 including, if a device is unidentified, deriving an ID from a device associated with a parent object to the child object for the unidentified device.

16. The method of claim 1 wherein the computer system has multiple paths between system devices.

17. In a computer system, a method for configuring devices within the system comprising:

providing device configuration information for types of devices that may be included within the computer system, the device configuration information for a device type including interface types by which devices of that device type connect to other devices;

determining the interface types of a current object associated with a device;

for each device type that can exist on a determined interface type of the current object, probing for devices of that type;

for a found device that has no associated object, creating a child object for the found device and a link between the current object and the child object;

for a found device that has an associated object, creating a link between the current object and the child object;

making a child object the current object; and repeating the above actions at least until the devices to be configured within the system have associated objects linked together.

18. A computer readable medium on which is stored a set of instructions for executing the method of claim 17.

19. The method of claim 17 wherein the computer system is a multiprocessor system have a non-uniform memory access architecture.

20. The method of claim 17, where a child object already exists for a found device, including:

determining whether the child object has an incoming link from another object which forward matches a proposed link from the current object to the child object;

if no, creating a link from the current object to the child object;

if yes, removing one of the current object and the other object and redirecting the incoming links of the object removed to the remaining of the current object and the other object.

21. The method of claim 17, where a child object already exists for a found device, including:

determining whether the child object has an outgoing link to another object which reverse matches a proposed link from the current object to the child object;

if no, creating a link from the current object to the child object;

if yes, removing one of the current object and the other object and redirecting the incoming links of the object removed to the remaining of the current object and the other object.

22. The method of claim 17 wherein the computer system has multiple paths between system devices.

23. A computer-readable medium on which is stored a configuration graph for a computer system, the graph comprising:

objects associated with devices of the computer system;

links connecting the objects; and for at least one child object, multiple incoming links connecting a child object to multiple parent objects.

24. The computer-readable medium of claim 23 wherein:

the object includes a data structure having a field for identifying the device type, a field for indicating links associated with the object, and a field for identifying the object; and the link includes a data structure having a field for indicating an interface type and a field indicating the parent and child ports for the link.

25. The computer-readable medium of claim 23 wherein the computer system is a multiprocessor system have a non-uniform memory access architecture.

* * * * *